(12) United States Patent
Cho et al.

(10) Patent No.: US 8,522,305 B2
(45) Date of Patent: Aug. 27, 2013

(54) SYSTEM AND METHOD FOR UPDATING USER IDENTIFIERS (IDS)

(75) Inventors: Yeong-Sub Cho, Daejeon (KR); Sang-Rae Cho, Daejeon (KR); Dae-Seon Choi, Daejeon (KR); Jong-Hyouk Noh, Daejeon (KR); Tae-Sung Kim, Daejeon (KR); Seung-Hyun Kim, Daegu (KR); Seung-Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1389 days.

(21) Appl. No.: 11/720,775

(22) PCT Filed: Oct. 25, 2005

(86) PCT No.: PCT/KR2005/003550
§ 371 (c)(1), (2), (4) Date: Jun. 4, 2007

(87) PCT Pub. No.: WO2006/062289
PCT Pub. Date: Jun. 15, 2006

(65) Prior Publication Data
US 2009/0235326 A1    Sep. 17, 2009

(30) Foreign Application Priority Data

Dec. 7, 2004  (KR) .................. 10-2004-0102390
Jun. 14, 2005 (KR) .................. 10-2005-0051085

(51) Int. Cl.
*G06F 17/00* (2006.01)
*H04L 29/06* (2006.01)

(52) U.S. Cl.
USPC ............. 726/1; 726/4; 726/5; 726/16; 726/27

(58) Field of Classification Search
USPC .......................... 713/202; 726/1, 4, 5, 16, 27
See application file for complete search history.

(56) References Cited

U.S. PATENT DOCUMENTS 8,205,239 B1 * 6/2012 Satish ............................... 726/1
2002/0078386 A1 * 6/2002 Bones et al. .................. 713/202
(Continued)

FOREIGN PATENT DOCUMENTS

EP        0884670      12/1998
JP        02-036456     2/1990
(Continued)

OTHER PUBLICATIONS

Written Opinion of the International Searching Authority; PCT/KR2005/003550; Feb. 8, 2006.
(Continued)

*Primary Examiner* — Jeffrey Pwu
*Assistant Examiner* — Jayesh Jhaveri
(74) *Attorney, Agent, or Firm* — Kile Park Reed & Houtteman PLLC (57) ABSTRACT

Provided are a system and method for updating a user identifier (ID). The user ID updating method includes: (a) collecting unauthorized access attempt information for a user ID; (b) creating a user ID update policy for an encoded user ID obtained by encoding the user ID, according to the unauthorized access attempt information collected in operation (a); (c) storing the user ID update policy created in operation (b); (d) loading the user ID update policy stored in operation (c) and determining whether or not to update the user ID; and (e) creating a new user ID if it is determined in operation (d) that the user ID should be updated, and changing the user ID to the new user ID. Therefore, it is possible to ensure security for user IDs, by dynamically creating and updating user IDs according to security environments.

14 Claims, 5 Drawing Sheets

(56) References Cited

U.S. PATENT DOCUMENTS

| | | | |
|---|---|---|---|
| 2004/0003294 A1* | 1/2004 | Moore | 713/202 |
| 2004/0117216 A1 | 6/2004 | Dutta et al. | |
| 2005/0114673 A1* | 5/2005 | Raikar et al. | 713/182 |
| 2006/0053296 A1* | 3/2006 | Busboom et al. | 713/182 |
| 2007/0006286 A1* | 1/2007 | Singhal | 726/4 |

FOREIGN PATENT DOCUMENTS

| | | |
|---|---|---|
| JP | 11-102337 | 4/1999 |
| JP | 2000339271 | 12/2000 |
| KR | 1020010110013 | 12/2001 |
| KR | 1020020028297 | 4/2002 |

OTHER PUBLICATIONS

International Search Report; PCT/KR2005/003550; Feb. 8, 2006.

* cited by examiner

USER ID UPDATE POLICY
UPDATE_NOW=0 DAY
UPDATE_SHORT=10 DAYS
UPDATE_LONG=30 DAYS
UPDATE_NORMAL=60 DAYS

FIG. 6

SYSTEM AND METHOD FOR UPDATING USER IDENTIFIERS (IDS)

CROSS-REFERENCE TO RELATED PATENT APPLICATIONS

This application claims the benefit of Korean Patent Applications Nos. 10-2004-0102390, filed on Dec. 7, 2004, and 10-2005-0051085, filed on Jun. 14, 2005, in the Korean Intellectual Property Office, the disclosures of which are incorporated herein in their entireties by reference.

BACKGROUND OF THE INVENTION

1. Field of the Invention

The present invention relates to a system and method for updating user identifiers (IDs), and more particularly, to a method and system for dynamically creating and updating user identifiers (IDs) shared between systems according to system security environments.

2. Description of the Related Art

Along with development and expansion of the Internet, electronic commerce is rapidly becoming a common feature of ever life. A user gets memberships of various service provider servers and thus receives services provided from the service provider servers. If a user requests a subscription to a service provider server, the service provider server requests the user to register an identifier (ID) and a password, validates a user authorization using the ID and password registered by the user and then provides services to the user. Many users have so many user IDs and passwords that they cannot correctly remember all their IDs and passwords. Accordingly, many systems provide a function for integrating and managing user's IDs and passwords.

Korean Patent Application No. 10-2000-0030890, entitled "The Method for Managing ID and Password", discloses a function for preventing a user from forgetting his/her IDs and passwords by enabling the user to integrate and manage his/her IDs and passwords registered on various service provider servers. However, in the Korean Patent Application No. 10-2000-0030890, the user must obtain an authentication from each service provider server whenever he/she accesses one of the service provider servers to use services thereof, which causes inconvenience when the user has registered on many service provider servers.

Recently, a Single Sign-On (SSO) technique has been developed in which additional authentications are unnecessary once a user obtains an authentication from one of his/her subscribed service provider servers. A "Passport" system created by Microsoft Corporation is an example of an SSO on the Internet. In the "Passport" system, a single service provider server manages user IDs, and other service provider servers are federated with the server provider server managing the user IDs. However, since user IDs and passwords are centrally managed by a service provider server of Microsoft Corporation, users are worried about privacy protection.

In order to resolve this privacy protection issue, the Liberty Alliance Group has defined a so-called "Federated Name Identifier" method, in which service provider severs, each managing user IDs and passwords, are federated with each other through an agreement and provide an SSO to users. The method assigns randomly created user IDs to the users without using the users' actual IDs and manages the encoded user IDs. That is, when a user accesses a service provider server SP in order to use services of the service provider server SP after he/she obtains an authentication through his/her ID from an ID service provider server IDSP, the ID service provider server IDSP transmits a pre-stored user ID for the service provider server SP to the service provider server SP.

The service provider server SP confirms through the user ID transmitted from the ID service provider server IDSP a fact that the user obtains an authentication, thereby requiring no further authentication for the user. In this case, the user ID transmitted to the service provider server SP is a randomly encoded user ID.

The Liberty Alliance Group defines a method for creating user IDs, but has no definition regarding when or under which circumstances user IDs should be updated. If system or user ID information is hacked, the user ID must be instantly updated. Also, in circumstances where unauthorized access attempts on a system are frequent, associated user IDs must be frequently updated in order to ensure security.

SUMMARY OF THE INVENTION

The present invention provides a method for dynamically creating and updating user identifiers (IDs) shared between systems, considering system or user security environments, such as unauthorized access of systems, unauthorized access of user ID information, etc.

According to an aspect of the present invention, there is provided a user identifier (ID) update system comprising: a security environment collecting unit collecting unauthorized access attempt information for a user ID; an ID policy creating unit creating a user ID update policy for an encoded user ID obtained by encoding the user ID, according to the unauthorized access attempt information received from the security environment collecting unit; an ID policy storage unit storing the user ID update policy; and an ID update unit loading the user ID update policy from the ID policy storage unit, creating a new user ID according to the user ID update policy, and changing the user ID to the new user ID.

According to another aspect of the present invention, there is provided a user identifier (ID) updating method comprising: (a) collecting unauthorized access attempt information for a user ID; (b) creating a user ID update policy for an encoded user ID obtained by encoding the user ID, according to the unauthorized access attempt information collected in operation (a); (c) storing the user ID update policy created in operation (b); (d) loading the user ID update policy stored in operation (c) and determining whether or not to update the user ID; and (e) creating a new user ID if it is determined in operation (d) that the user ID should be updated, and changing the user ID to the new user ID.

According to still another aspect of the present invention, there is provided a user identifier (ID) updating method comprising: (a) receiving a user ID update policy created by a service provider server which is federated with a user ID update system through the user ID; (b) storing the user ID update policy received in operation (a); (c) loading the user ID update policy stored in operation (b) and determining whether or not to update the user ID; and (d) creating a new user ID if it is determined in operation (c) that the user ID should be updated, and changing the user ID to the new user ID.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
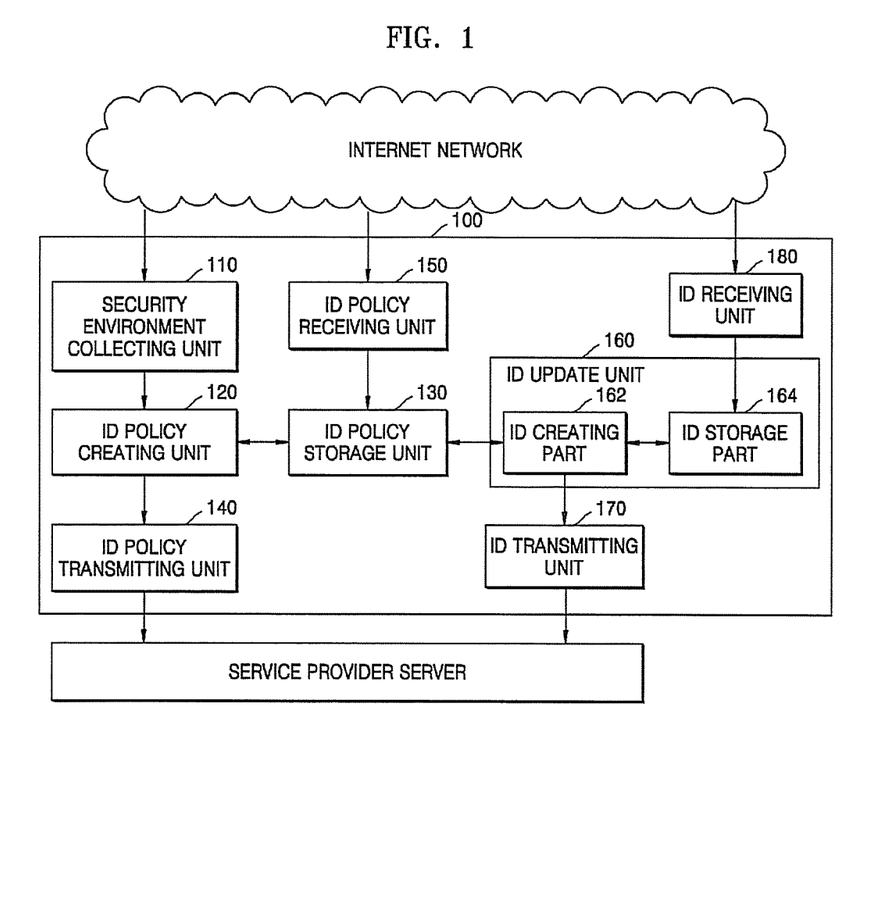
FIG. 1 is a block diagram of a user identifier (ID) update system according to an embodiment of the present invention.

FIG. 1 is a block diagram of a user identifier (ID) update system 100 according to an embodiment of the present invention. Referring to FIG. 1, the user ID update system 100 includes a security environment collecting unit 110, an ID policy creating unit 120, an ID policy storage unit 130, an ID policy transmitting unit 140, an ID policy receiving unit 150, an ID update unit 160, an ID transmitting unit 170, and an ID receiving unit 180. Here, the ID update unit 160 includes an ID creating part 162 and an ID storage part 164.

The security environment collecting unit 110 collects unauthorized access attempt information on the user ID update system 100 and user IDs. In this case, the user IDs are randomly encoded user IDs. The ID policy creating unit 120 creates a user ID update policy according to the unauthorized access attempt information received from the policy environment collecting unit 110. The user ID update policy will be described in detail later with reference to FIG. 3.

The ID policy storage unit 130 stores the user ID update policy created by the ID policy creating unit 120.

The ID policy transmitting unit 140 provides the user ID update policy created by the ID policy creating unit 120 to a service provider server which is federated with the user ID update system 100 through the user ID.

Thereafter, the service provider server which is federated with the user ID update system 100 through the user ID updates the user ID under a predetermined condition, according to the user ID update policy created by the ID policy creating unit 120. Here, each service provider server, which is federated with the user ID update system 100 through the user ID, stores all user IDs which are shared by the user ID update system 100 and the service provider server. Thus, when a user which has acquired an authentication from the user ID update system 100 through his/her ID and password accesses the service provider server in order to use services of the service provider server, the user ID update system 100 transmits the user ID shared by the service provider server to the service provider server. Accordingly, the user can use the services of the service provider server without any further authentication.

The ID policy receiving unit 150 receives the user ID update policy created by the service provider server which is federated with the user ID update system 100 through the user ID, and stores the received user ID update policy in the ID policy storage unit 130.

The ID update unit 160 loads the user ID update policy stored in the ID policy storage unit 130, creates and stores a new user ID according to the user ID update policy, and changes the pre-stored user ID to the new user ID.

The ID update unit 160 includes the ID creating part 162 and the ID storage part 164 as described above. The ID creating part 162 loads the user ID update policy from the ID policy storage unit 130 and creates the new user ID according to the user ID update policy. The ID storage part 164 stores the new user ID created by the ID creating part 162, and changes the pre-stored user ID to the new user ID.

The ID transmitting unit 170 transmits the new user ID to the service provider server which is federated with the user ID update system 100 through the user ID.

As described above, the user ID update system 100 and the service provider server federated with the user ID update system 100 through the user ID, respectively store user IDs which are shared by them. If the user ID update system 100 creates and updates a new user ID, it transmits the new user ID to the service provider server, so that the service provider server also updates the corresponding user ID.

The ID receiving unit 180 receives a new user ID created by the service provider server federated with the user ID update system 100 through the user ID, and transmits the new user ID to the ID update unit 160. The ID update unit 160 stores the new user ID in the ID storage part 164 and changes the pre-stored user ID to the new user ID.

Figure 2:
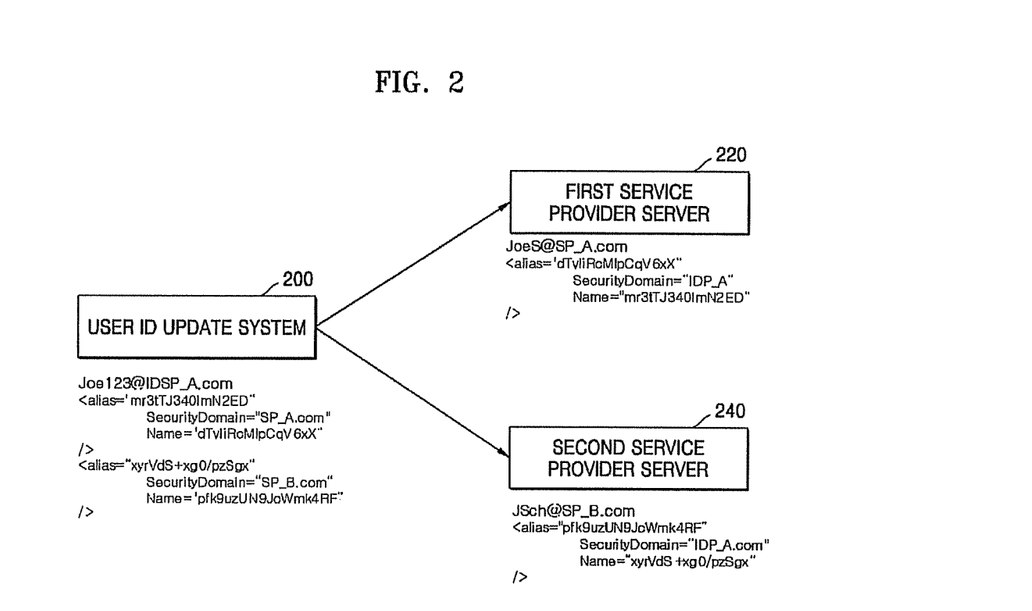
FIG. 2 is a view for explaining examples of user IDs shared between the user ID update system illustrated in FIG. 1 and service provider servers.

FIG. 2 is a view for explaining examples of user IDs shared between a user ID update system 200 and service provider servers;

Referring to FIG. 2, a method in which the user ID update system 200 and the service provider servers are federated with each other and provide Single Sign-On (SSO) for a user "Joe", will be explained below.

As illustrated in FIG. 2, the user ID update system 200 uses "Joe123" as a user ID for the user "Joe", a first service provider server 220 uses "JoeS" as a user ID for the user "Joe", and a second service provider server 240 uses "JSch" as a user ID for the user "Joe".

If the user ID update system 200 is federated with the first service provider server 220, the user ID update system 200 uses "mr3tTJ3401mN2ED" as a user ID for the user "Joe" and the user ID "mr3tTJ3401mN2ED" is stored in the user ID update system 200 and the first service provider server 220. Also, the first service provider server 220 uses "dTvliRcMIpCqV6xX" as a user ID for the user "Joe" and the user ID "dTvliRcMIpCqV6xX" is stored in the user ID update system 200 and the first service provider server 220.

As described above, the user IDs shared between the user ID update system 200 and the first service provider server 220 must be randomly created and periodically updated in order to prevent the user IDs from being revealed.

If the user ID update system 200 is federated with the second service provider server 240, the user ID update system 200 uses "xyrVds+xg0/pzSgx" as a user ID for the user "Joe" and the user ID "xyrVds+xg0/pzSgx" is stored in the user ID update system 200 and the second service provider server 240. Also, the second service provider server 240 uses "pfk9uzUN9JcWmk4RF" as a user ID for the user "Joe" and the user ID "pfk9uzUN9JcWmk4RF" is stored in the user ID update system 200 and the second service provider server 240.

As described above, the user IDs shared between the user ID update system 200 and the second service provider server 240 must be randomly created and periodically updated in order to prevent the user IDs from being revealed.

Figure 3:
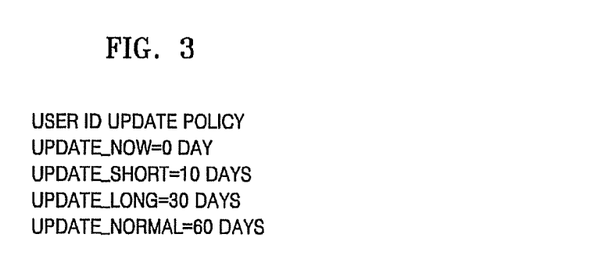
FIG. 3 is a view illustrating an example of a user ID updating policy illustrated in FIG. 1.

FIG. 3 is a view illustrating an example of the user ID update policy illustrated in FIG. 1. Referring to FIG. 3, the user ID update policy may be one of an update_Now policy, an update_Short policy, an update_Long policy, and an update_Normal policy. The update_Now policy is applied to immediately update the user ID when the user ID update system 200 or the user ID is accessed without authorization.

In FIG. 3, the update-policy is set to immediately update the user ID. The update_Short policy is applied to update the user ID as promptly as possible when unauthorized access attempts on the user ID update system 200 or user ID information are frequent. A determination on whether or not unauthorized access attempts are frequent depends as to the number of unauthorized access attempts occurring during a predetermined period (that is, it is determined that unauthorized access attempts are frequent when the number of unauthorized access attempts exceeds a predetermined number). In FIG. 3, the update_Short policy is set to update the user ID after 10 days have elapsed.

The update_Long policy is applied to update the user ID more frequently than in a normal status when unauthorized access attempts on the user ID update system 200 or user ID information occasionally occur. Here, whether or not unauthorized access attempts are defined as happening occasionally depends on the number of unauthorized access attempts occurring during a predetermined period (that is, it is determined that unauthorized access attempts occasionally occur when the number of unauthorized access attempts is less than a predetermined number). In FIG. 3, the update_Long policy is set to update the user ID after 30 days have elapsed.

The update_Normal policy is applied to normally update the user ID when there is no unauthorized access attempt on the user ID update system 200 and user ID information. In FIG. 3, the update_Normal policy is set to update the user ID after 60 days have elapsed.

FIG. 3 illustrates an example where the update_Now policy is set to immediately update the user ID, the update_Short policy is set to update the user ID after 10 days have elapsed, the update_Long policy is set to update the user ID after 30 days have elapsed, and the update_Normal policy is set to update the user ID after 60 days have elapsed, but the invention is not limited to this.

Figure 4:
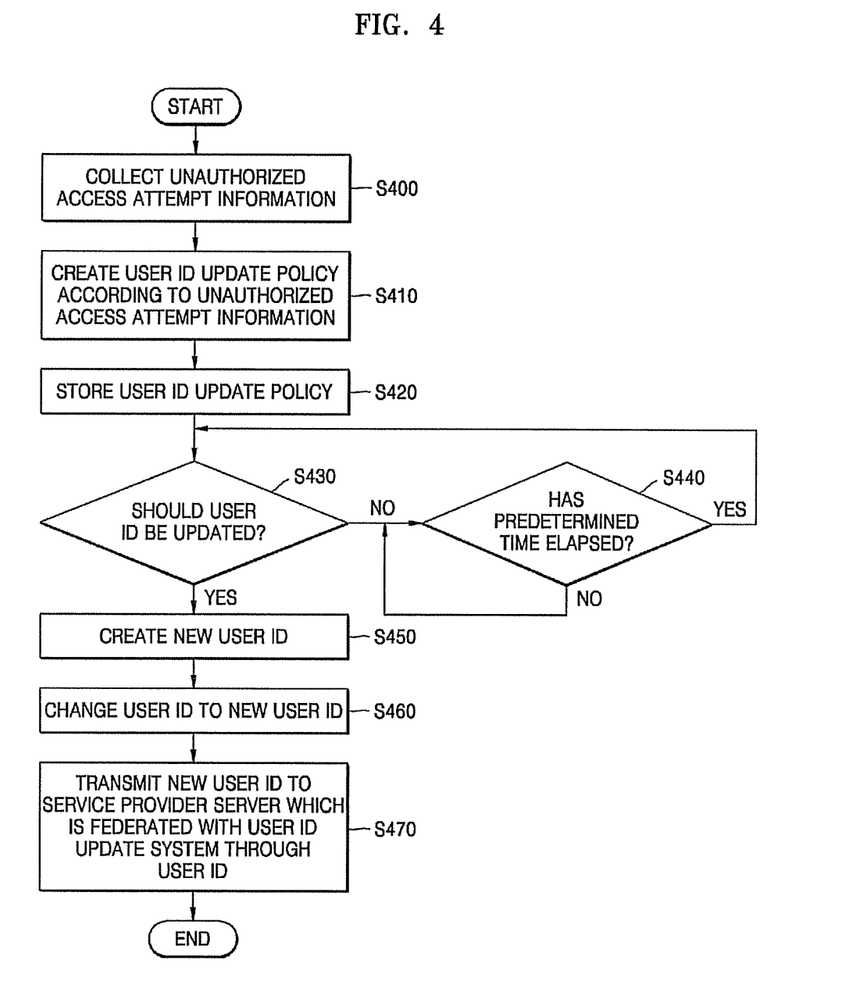
FIG. 4 is a flowchart illustrating a user ID updating method according to an embodiment of the present invention.

FIG. 4 is a flowchart illustrating a user ID updating method according to an embodiment of the present invention.

Referring to FIG. 4, firstly, unauthorized access attempt information on a user ID update system or user ID information is collected (operation S400).

Then, a user ID update policy for an encoded user ID obtained by encoding a user ID is created according to the unauthorized access attempt information collected in operation S400 (operation S410). In more detail, the user ID update policy may be one of: an update_Now policy for immediately updating a user ID; an update_Short policy for updating a user ID after 10 days have elapsed; an update_Long policy for updating a user ID after 30 days have elapsed; and an update_Normal policy for updating a user ID after 60 days have elapsed. The user ID updating policies created according to the unauthorized access attempt information will be described in detail later with reference to FIG. 5. Here, the user ID is an encoded user ID obtained by randomly encoding a user ID.

Then, the user ID update policy created in operation S410 is stored (operation S420).

Next, the user ID update policy stored in operation S420 is loaded and it is determined whether or not the user ID should be updated (operation S430). A decision on whether or not the user ID should be updated depends on whether or not a predetermined period defined in the user ID update policy has elapsed.

If it is determined in operation S430 that the user ID does not need to be updated, the process proceeds to operation S440 so as to determine whether or not the predetermined time has elapsed. If it is determined in operation S440 that he predetermined time has not elapsed, operation S440 is repeated. If it is determined that the predetermined time has elapsed, the process returns to operation S430.

Meanwhile, if it is determined in operation S430 that the user ID should be updated, the method proceeds to operation S450. In operation S450, a new user ID is created.

Then, the new user ID is stored and the pre-stored user ID is changed to the new user ID (operation S460).

Successively, the new user ID created in operation S460 is transmitted to a service provider server which is federated with the user ID update system through the user ID (operation S470).

Figure 5:
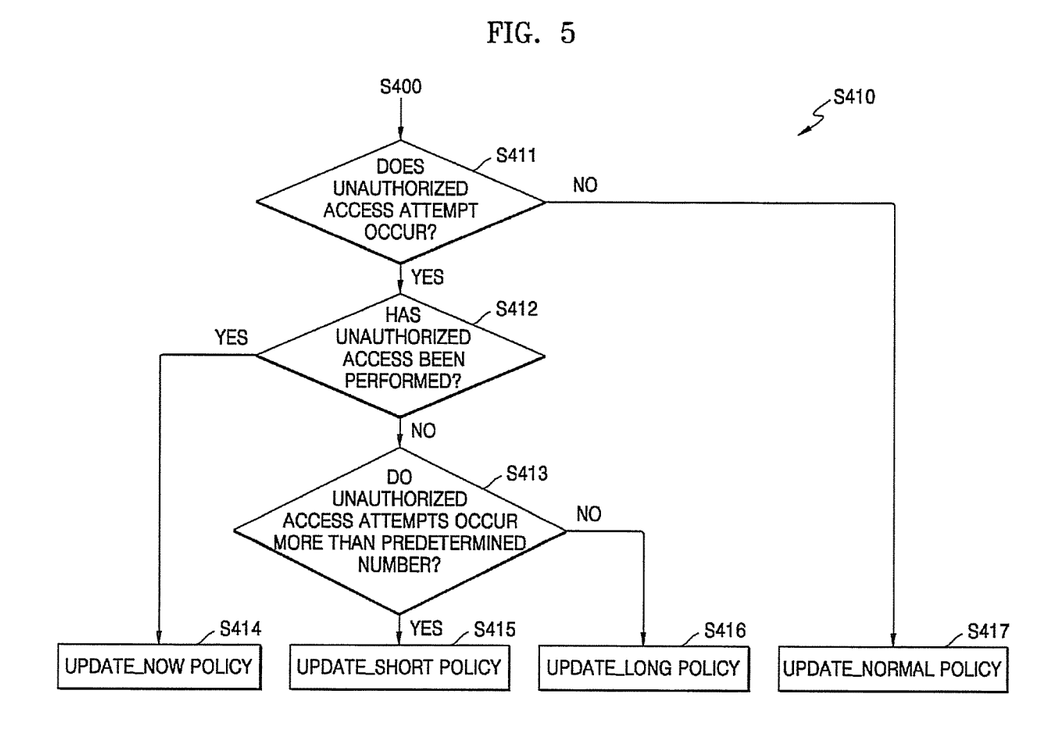
FIG. 5 is a flowchart illustrating in detail an operation S410 illustrated in FIG. 4.

FIG. 5 is a flowchart illustrating in detail the operation S410 illustrated in FIG. 4. Referring to FIG. 5, it is determined whether an unauthorized access attempt on the user ID occurs based on the unauthorized access attempt information collected in operation S400 (operation S411).

If it is determined in operation S411 that no unauthorized access attempt occurs, the process proceeds to operation S417 and the update_Normal policy is created. If it is determined in operation S411 that an unauthorized access attempt occurs, the process proceeds to operation S412.

In operation S412, it is determined whether or not unauthorized access has occurred based on the unauthorized access attempt information.

If it is determined in operation S412 that unauthorized access has occurred, the process proceeds to operation S414 and the update_Now policy is created. On the contrary, if it is determined in operation S413 that no unauthorized access has occurred, the process proceeds to operation S413.

In operation S413, it is determined whether or not the number of unauthorized access attempts exceeds a predetermined number. Different update policies can be applied according to whether the number of unauthorized access attempts is more or less than a predetermined number. If it is determined in operation S413 that the number of unauthorized access attempts exceeds the predetermined number, the process proceeds to operation S415 and the update_Short policy is created. Meanwhile, if it is determined in operation S413 that the number of unauthorized access attempts is less than the predetermined number, the process proceeds to operation S416 and the update_Long policy is created.

As described above, the user ID update policy may be one of: the update_Now policy, the update_Short policy, the update_Long policy, and the update_Normal policy. The respective user ID update policies will now be described in detail.

The update_Now policy is used for immediately updating the user ID when the user ID update system or the user ID is accessed without authorization. In FIG. 5, the updata_Now policy immediately updates the user ID. The update_Short policy is used for updating the user ID as promptly as possible when unauthorized access attempts on the user ID update system or the user ID are frequent. Whether or not unauthorized access attempts are defined as being frequent depends on the number of unauthorized access attempts occurring during a predetermined period (that is, it is determined that unauthorized access attempts are frequent when the number of unauthorized access attempts exceeds a predetermined number). In FIG. 5, the update_Short policy updates the user ID after 10 days have elapsed. The update_Long policy is applied when unauthorized access attempts on the user ID update system or user ID information occasionally occur. Whether or not unauthorized access attempts are defined as happening occasionally depends on the number of unauthorized access attempts occurring during a predetermined period (that is, it is determined that unauthorized access attempts occasionally occur when the number of unauthorized access attempts is less than the predetermined number). In FIG. 5, the update_Long policy updates the user ID after 30 days have elapsed. The update_Normal policy is used for updating the user ID in a normal state when there is no unauthorized access attempt on the user ID update system and the user ID. In FIG. 5, the update_Normal policy updates the user ID after 60 days have elapsed.

FIG. 5 illustrates an example in which the update_Now policy is set to immediately update the user ID, the update_Short policy is set to update the user ID after 10 days have elapsed, the update_Long policy is set to update the user ID after 30 days have elapsed, and the update_Normal policy is set to update the user ID after 60 days have elapsed, but the invention is not limited to this.

Figure 6:
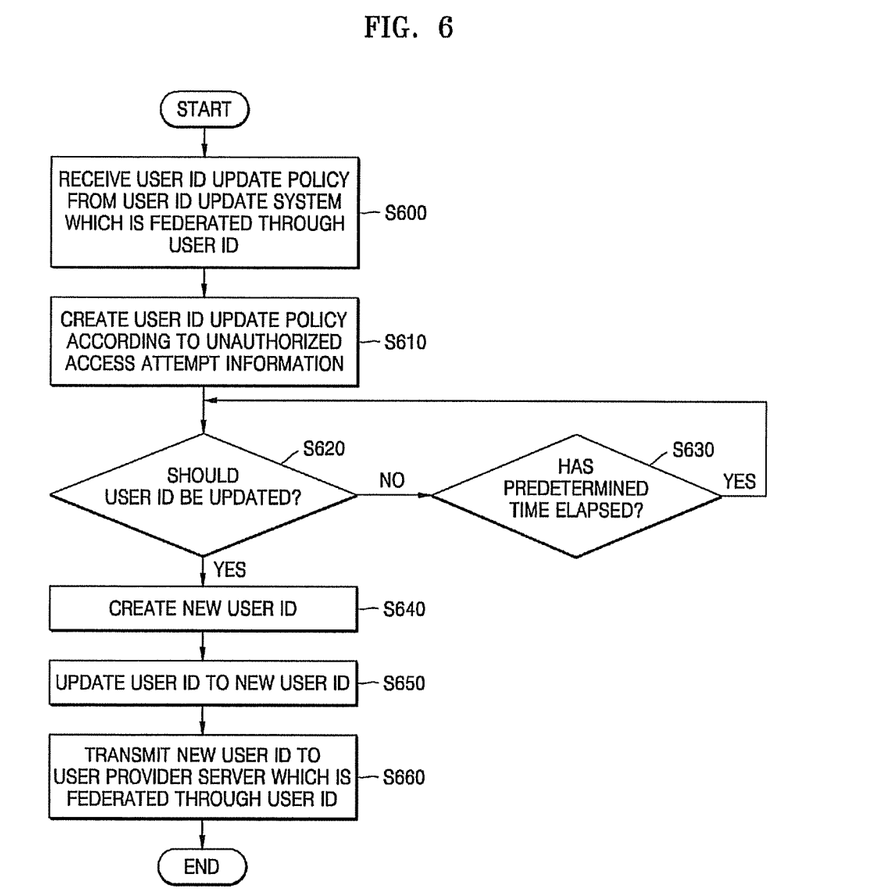
FIG. 6 is a flowchart illustrating a user ID updating method according to another embodiment of the preset invention.

FIG. 6 is a flowchart illustrating a user ID updating method according to another embodiment of the present invention. Referring to FIG. 6, firstly, a service provider server which is federated with a user ID update system through a user ID receives a user ID update policy (operation S600). In more detail, the user ID update policy may be one of: an update_Now policy for immediately updating a user ID; an update_Short policy for updating a user ID after 10 days have elapsed; an update_Long policy for updating a user ID after 30 days have elapsed; and an update_Normal policy for updating a user ID after 60 days have elapsed. Here, the user ID is an encoded user ID obtained by randomly encoding a user ID.

Then, the user ID update policy created in operation S600 is stored (operation S610).

Successively, the user ID update policy stored in operation S610 is loaded and it is determined whether or not the user ID should be updated (operation S620). Whether or not the user ID should be updated depends on whether or not a predetermined period defined in the user ID update policy has elapsed.

If it is determined in operation S620 that the user ID does not need to be updated, the process proceeds to operation S630 and it is determined whether or not the predetermined time has elapsed. If it is determined in operation S630 that the predetermined time has not elapsed, operation S630 is repeated. If it is determined that the predetermined time has elapsed, the process reverts to operation S620.

Meanwhile, if it is determined in operation S620 that the user ID should be updated, the process proceeds to operation S640. In operation S640, a new user ID is created.

Then, the new user ID is stored and the pre-stored user ID is changed to the new user ID (operation S650).

Next, the new user ID created in operation S650 is transmitted to a service provider server which is federated with the user ID update system through the user ID (operation S660).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

As described above, according to the present invention, it is possible to ensure security between systems and provide reliability for user IDs, by dynamically creating and updating user IDs which are shared between systems, considering security environments, such as unauthorized access of systems, unauthorized access of user ID information, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer program product for a user identifier (ID) update system which is in communication with a service provider server external to the user ID update system, the computer program product comprising computer-readable code stored on a non-transitory computer-readable medium, wherein the computer-readable code when executed by a computer, causes the computer to perform:

collecting, by a security environment collecting unit, unauthorized access attempt information for a user ID, wherein the user ID is shared between the user ID update system and the service provider server;

creating, by an ID policy creating unit in communication with the security environment collecting unit, a user ID update policy for the user ID according to the unauthorized access attempt information received from the security environment collecting unit;

storing, by an ID policy storage unit coupled with the ID policy creating unit, the user ID update policy;

loading, by an ID update unit coupled with the ID policy storage unit, the user ID update policy from the ID policy storage unit, creating a new user ID according to the user ID update policy, and changing the user ID to the new user ID; and transmitting, by an ID policy transmitting unit coupled with the ID policy creating unit, the user ID update policy to the service provider server which is federated with and external to the user ID update system, wherein the user ID update policy created by the ID policy creating unit specifies one of a plurality of predetermined time periods according to the unauthorized access attempt information, wherein the computer-readable code, when executed by the computer, further causes the computer to perform:
determining, by the ID update unit, whether the one of the plurality of predetermined time periods has elapsed, and creating the new user ID once the predetermined time period has elapsed, and wherein the computer-readable code, when executed by the computer, further causes the computer to perform:
transmitting, by an ID transmitting unit, the new user ID created by the ID update unit to a service provider server which is federated with the user ID update system.

2. The computer program product of claim 1, wherein the computer-readable code, when executed by the computer, further causes the computer to perform:

receiving, by an ID policy receiving unit, a user ID update policy created by a service provider server which is federated with the user ID update system, and storing the received user ID update policy in the ID policy storage unit.

3. The computer program product of claim 1, wherein the computer-readable code, when executed by the computer, further causes the computer to perform:

loading, by an ID creating part of the ID update unit, a user ID update policy from the ID policy storage unit and creating a new user ID according to the user ID update policy; and storing, by an ID storage part of the ID update unit, the new user ID created by the ID creating part and changing the user ID to the new user ID.

4. The computer program product of claim 3, wherein the computer-readable code, when executed by the computer, further causes the computer to perform:
receiving, by an ID receiving unit, a new user ID created by the federated service provider server and storing the new user ID in the ID storage part.

5. The computer program product of claim 1, wherein the user ID update policy created by the ID policy creating unit is:
an update_Now policy for immediately updating the user ID when the unauthorized access attempt information indicates that the user ID has been accessed without authorization;
an update_Short policy for updating the user ID after a first period has elapsed when the unauthorized access attempt information indicates that a number of unauthorized access attempts on the user ID exceeds a predetermined number;
an update_Long policy for updating the user ID after a second period longer than the first period has elapsed when the unauthorized access attempt information indicates that the number of unauthorized access attempts on the user ID is less than the predetermined number; and
an update_Normal policy for updating the user ID after a third period longer than the second period has elapsed when the unauthorized access attempt information indicates that there has been no unauthorized access attempt on the user ID.

6. The computer program product of claim 1, wherein the user ID is an encoded user ID obtained by encoding another user ID.

7. A user identifier (ID) updating method for use in a user ID update system federated with a service provider server external to the user ID update system and having a security environment collecting unit, an ID policy creating unit, an ID policy storage unit, an ID update unit, and an ID policy transmitting unit, the method executed by computer-readable code stored in a non-transitory computer-readable medium, the method comprising:
(a) collecting, in the security environment collecting unit, unauthorized access attempt information for a user ID, wherein the user ID is shared between the user ID update system and the service provider server;
(b) creating, in the ID policy creating unit, a user ID update policy for the user ID according to the unauthorized access attempt information collected in operation (a), wherein the created user ID update policy specifies one of a plurality of predetermined time periods according to the unauthorized access attempt information;
(c) storing, in the ID policy storage unit, the user ID update policy created in operation (b);
(d) loading, in the ID update unit, the user ID update policy stored in operation (c), determining whether the one of the plurality of predetermined time periods has elapsed, and determining whether or not to update the user ID;
(e) creating, in an ID creating part of the ID update unit, a new user ID if it is determined in operation (d) that the user ID should be updated and that the predetermined time period has elapsed, and changing the user ID to the new user ID;
(f) transmitting, in the ID policy transmitting unit, the user ID update policy created in operation (b) to a service provider server which is federated with and external to the user ID update system; and
(g) transmitting the new user ID created in operation (e) to a service provider server which is federated with the user ID update system through the user ID.

8. The method of claim 7, wherein the user ID update policy created by the ID policy creating unit is:
an update_Now policy for immediately updating the user ID when the unauthorized access attempt information indicates that the user ID is hacked;
an update_Short policy for updating the user ID after a first period has elapsed when the unauthorized access attempt information indicates that a number of unauthorized access attempts on the user ID occur exceeds a predetermined number;
an update_Long policy for updating the user ID after a second period longer than the first period has elapsed when the unauthorized access attempt information indicates that the number of unauthorized access attempts on the user ID is less than the predetermined number; and
an update_Normal policy for updating the user ID after a third period longer than the second period has elapsed when the unauthorized access attempt information indicates that there has been no unauthorized access attempt on the user ID.

9. The method of claim 8, wherein, in operation (d), determining whether or not to update the user ID depends on whether or not a predetermined period corresponding to the user ID update policy has elapsed.

10. The method of claim 7, wherein the user ID is an encoded user ID obtained by encoding another user ID.

11. A user identifier (ID) updating method for use in a user ID update system federated with a service provider server external to the user ID update system and having an ID policy receiving unit, an ID policy storage unit, and an ID update unit, the method executed by computer-readable code stored in a non-transitory computer-readable medium, the method comprising:
(a) receiving, in the ID policy receiving unit, a user ID update policy created by the service provider server which is federated with and external to the user ID update system through a user ID, wherein the user ID is shared between the user ID update system and the service provider server, wherein the received user ID update policy specifies one of a plurality of predetermined time periods, and wherein the received user ID update policy is created for the user ID according to previously-collected unauthorized access attempt information for the user ID;
(b) storing, in the ID policy storage unit, the user ID update policy received in operation (a);
(c) loading, in the ID update unit, the user ID update policy stored in operation (b), determining whether the one of the plurality of predetermined time periods has elapsed, and determining whether or not to update the user ID;
(d) creating, in an ID creating part of the ID update unit, a new user ID if it is determined in operation (c) that the user ID should be updated and that the predetermined time period has elapsed, and changing the user ID to the new user ID; and
(e) transmitting the new user ID created in operation (d) to the service provider server.

12. The method of claim 11, wherein, in operation (a), the received user ID update policy is:
an update_Now policy for immediately updating the user ID when the unauthorized access attempt information indicates that the user ID has been accessed without authorization;

an update_Short policy for updating the user ID after a first period has elapsed when the unauthorized access attempt information indicates that a number of unauthorized access attempts on the user ID exceeds a predetermined number;

an update_Long policy for updating the user ID after a second period longer than the first period has elapsed when the unauthorized access attempt information indicates that the number of unauthorized access attempts on the user ID is less than the predetermined number; and a update Normal policy for updating the user ID after a third period longer than the second period has elapsed when the unauthorized access attempt information indicates that there has been no unauthorized access attempt on the user ID.

13. The method of claim 12, wherein, in operation (c), determining on whether or not to update the user ID depends on whether or not a predetermined period corresponding to the user ID update policy has elapsed.

14. The method of claim 11, wherein the user ID is an encoded user ID obtained by encoding another user ID.

* * * * *